April 19, 1938.　　　F. W. CALDWELL　　　2,114,414
METHOD OF MAKING PROPELLER BLADES
Original Filed April 21, 1931

INVENTOR.
FRANK W. CALDWELL
BY Harris G. Luther
ATTORNEY

Patented Apr. 19, 1938

2,114,414

UNITED STATES PATENT OFFICE

2,114,414

METHOD OF MAKING PROPELLER BLADES

Frank W. Caldwell, Hartford, Conn., assignor, by mesne assignments, to United Aircraft Corporation, a corporation of Delaware Original application April 21, 1931, Serial No. 531,685, now Patent No. 2,032,254, dated February 25, 1936. Divided and this application December 18, 1935, Serial No. 55,052

2 Claims. (Cl. 29—156.8)

This invention relates generally to propellers for aircraft, and more particularly to controllable pitch propellers for aircraft.

An object of the invention is to provide an improved method of making and assembling controllable pitch propeller mechanism.

Figure 1:
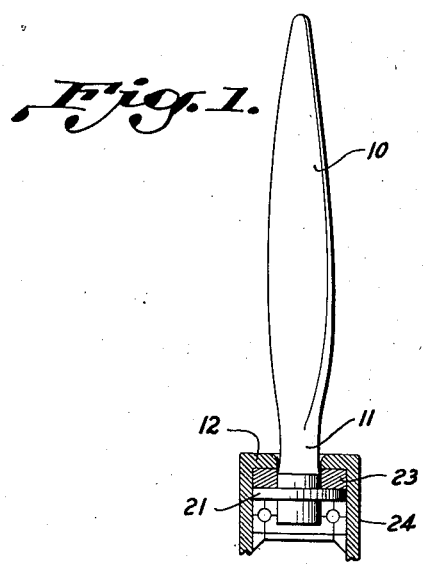
Fig. 1 is an elevational view, partly in section, of a propeller blade constructed in accordance with my invention.
Figure 2:
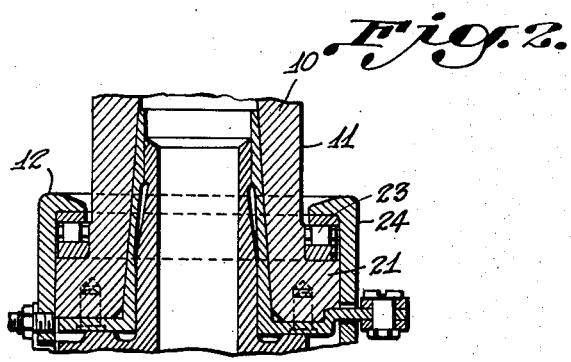
Fig. 2 is an enlarged sectional view also showing an embodiment of the invention.

In the drawing I have shown a propeller blade 10 having a shank portion 11 provided with a flange 21 against which a thrust bearing 23 seats. The thrust bearing 23 seats also against the inturned portion 12 of a hub barrel 24.

The preferred method of manufacturing is to complete the blade with the exception of forming the flange 21. The shank of the blade is then heated to suitable temperature and the bearing 23 is slipped loosely over the root of the heated blade and moved on the shank to a position some distance from the end of the shank. The flange 21 is then formed by an upsetting process in the usual manner. The bearing 23 may be moved a considerable distance from the end of the shank, permitting the upsetting of the shank end without damage to the bearing. The flange 21 and the exterior of the shank are then machined to provide accurate seating surfaces, after which the bearing 23 is moved down the shank to engage the seating surfaces. In case the blades used are of a light alloy requiring heat treatment after the up-setting operation to develop the full strength of the material, it is desirable to utilize bearings made of special steel of such characteristics that its hardness is not affected by the temperature used in heat treating the metal of the blade.

This application is a division of my co-pending application, Serial No. 531,685, filed April 21, 1931, on which Patent Number 2,032,254 was granted on February 25, 1936.

The drawing and descriptions are for purposes of explanation and illustration only and not for the purpose of defining and limiting the invention, which is defined in the appended claims.

What I claim is:

1. A method of making a blade for a controllable pitch propeller that comprises forming a blade body portion having a hollow shank, placing a bearing raceway on the shank and moving it towards the tip of the propeller beyond its operating position, upsetting the end of the shank to form a flange, machining the flange and the shank to fit the bearing, and moving the bearing onto the machined portion of the shank.

2. In the manufacture of propellers, the process which consists of forming a blade with a substantially cylindrical shank, assembling a thrust bearing over the shank, and spreading the end of the shank by an upsetting operation to form an enlarged abutment on the end of the shank for engagement with the thrust bearing.

FRANK W. CALDWELL.